(12) United States Patent
Pregara

(10) Patent No.: US 6,600,878 B2
(45) Date of Patent: Jul. 29, 2003

(54) AUTOFOCUS SENSOR

(76) Inventor: Silvano Pregara, 14446 Mann Park Crescent, White Rock, BC (CA), V4B 3A8

(*) Notice: Subject to any disclaimer, the term of this patent is extended or adjusted under 35 U.S.C. 154(b) by 0 days.

(21) Appl. No.: 10/027,979

(22) Filed: Oct. 24, 2001

(65) Prior Publication Data

US 2003/0021600 A1 Jan. 30, 2003

(51) Int. Cl.$^7$ .............................. G03B 7/099; G03B 3/10
(52) U.S. Cl. ........................................ 396/111; 396/121
(58) Field of Search ................................ 396/111, 115, 396/121; 250/201.4, 201.8

(56) References Cited

U.S. PATENT DOCUMENTS

| | | | |
|---|---|---|---|
| 3,455,243 A | * | 7/1969 | Martin ..................... 102/213 |
| 3,617,128 A | * | 11/1971 | Harvey ..................... 356/4.03 |
| 3,937,950 A | * | 2/1976 | Hosoe et al. ............. 250/208.1 |
| 4,185,191 A | | 1/1980 | Stauffer |
| 4,511,248 A | * | 4/1985 | Abbas ....................... 356/4.07 |
| 5,530,513 A | * | 6/1996 | Ohsawa ..................... 396/121 |
| 5,619,300 A | | 4/1997 | Watanabe |
| 5,623,708 A | | 4/1997 | Watanabe |
| 5,694,632 A | | 12/1997 | Capper |
| 5,835,143 A | | 11/1998 | Kakiuchi |
| 5,860,032 A | | 1/1999 | Iwane |
| 6,085,041 A | | 7/2000 | Shiokama |
| 6,128,444 A | | 10/2000 | Sensui |

OTHER PUBLICATIONS

Yalin Xiong and Steven A. Shafer; Depth from Focusing and Defocusing; Mar. 1993; 28 pages; Carnegie Mellon University; Pittsburgh, Pennsylvania, USA.

* cited by examiner

*Primary Examiner*—Russell Adams
*Assistant Examiner*—Arthur A. Smith
(74) *Attorney, Agent, or Firm*—Robert H. Barrigar

(57) ABSTRACT

A passive autofocus sensor for a camera comprising charge-coupled device ("CCD") elements arranged in a plurality of curved segments to form generally circular or semi-circular sensor spots. Such an autofocus sensor enables the camera to detect contrast in the subject being photographed in a multitude of directions about the axis of the camera's focusing lens, hence improving the camera's ability to automatically focus upon the subject being photographed.

13 Claims, 4 Drawing Sheets

AUTOFOCUS SENSOR

RELATED APPLICATIONS

This patent application claims priority from Canadian patent application No. 2,354,614 filed Jul. 30, 2001.

FIELD OF THE INVENTION

This invention relates to a passive autofocusing system for use in cameras and camcorders.

BACKGROUND OF THE INVENTION

Passive autofocus systems are widely used in cameras and camcorders for automatically bringing the subject being photographed or filmed into focus. Such systems are termed "passive" as they respond only to light received from subjects in the field of view; they do not generate any pulses or beams of light to assist in autofocusing.

In such cameras, light from the subject enters the camera through a focusing lens and is directed by suitable mirrors and lenses to an autofocus sensor. The autofocus sensor determines a measure of how well the camera is currently focused as a number (the "defocus amount"). Larger values for the defocus amount indicate that the camera is further out of focus; smaller values indicate that the camera is closer to being in focus. The best focus available with particular equipment is obtained when the defocus amount is a minimum.

The user of an autofocus camera can select a tracking mode in which the camera automatically adjusts the position of the focusing lens based on the defocus amount. In this mode, the defocus amount determines by how much the focusing lens should be moved so as to provide the best focus. The movement of the focusing lens is made by a lens drive unit, typically comprising a motor and gear drive mechanism. After each movement of the focusing lens, the cycle is repeated—a further measurement of the defocus amount is made and another position adjustment is made to further refine the focusing. This loop is repeated endlessly until the user either releases the shutter mechanism to capture an image or switches out of the tracking mode.

The implementation of the tracking mode varies from camera to camera. Designers skilled in the art can provide a variety of control loops to achieve autofocusing based on the defocus amount. The resulting designs typically make use of parameters such as the masses of the focusing lens and the gears, the amount of friction present, the torque available in the drive motor and the nature of feedback employed.

In cameras having a sufficiently short cycle time for a tracking mode cycle and a sufficiently responsive lens drive unit, the adjustments to the focusing lens position can be made to keep track of a moving subject. This technology relies on maintaining an estimate of the velocity of the subject and predicting the change in focusing lens position necessary to have the subject in focus by the time the motor has had a chance to move.

The autofocus sensor can have more than one focus detector located in the field of view. Each focus detector is capable of determining a defocus amount based on the light incident in that part of the field of view. In some cameras, the user selects the focus detector to use; in other cameras, the selection is made by the camera's microprocessor according to a stored algorithm.

The focus detectors are made of strips of charge coupled device ("CCD") sensor elements. Typically, each of these strips has 50 CCD sensor elements. The incident light produces a voltage on each CCD sensor element proportional to the intensity and duration of exposure of the incident light. The set of voltages appearing on an entire strip of CCD sensors represents a scan of the intensity of light originating from an approximately linear segment of the field of view (linear within expected design and manufacturing tolerances). With, for example, 50 CCD elements in a sensor strip, the resulting scan produces 50 values representative of the intensity. Any prominent feature perpendicular to the linear segment appears as a sharp transition in intensity along the CCD sensor strip.

Focus detection relies on CCD sensor strips used in pairs. When the focus detector is in use, light from a subject area in the field of view enters the camera through the focusing lens and passes through a secondary imaging lens. The secondary imaging lens directs a portion of the beam along two different light paths so that both sensor strips in a pair are illuminated from the same source. The arrangement of the secondary imaging lens and the CCD sensor strips is made so that both CCD sensor strips in a pair display approximately the same voltage scan, but with one scan shifted out of phase with the other. The defocus amount is calculated as a measure of how much one scan is out of phase with respect to the other, a technique known widely as phase detection.

There are a number of techniques for calculating a defocus amount from the voltages on two CCD sensor strips. For example, Xiong and Shafer describe their research into depth estimation in a technical report (Yalin Xiong and Stephen A. Shafer. Depth from Focusing and Defocusing. Technical Report CMU-RI-TR-93-07, The Robotics Institute, Carnegie Mellon University, 1993) available on the Internet at http://www.ri.cmu.edu/projects/project_365_text.html. However, the exact details of the calculation of the defocus amount are not relevant to the invention described here.

Each camera design and pair of CCD sensor strips has a known reference value for the minimum defocus amount which brings the subject into best focus. A comparison of the measured defocus amount against the reference value provides the data to control the movement of the motor and gear drive mechanism to move the focusing lens.

The focus detection technique works best if there is a large change or changes in the intensity of light measured along the CCD sensor strips. For example, if both scans from a pair of CCD sensor strips are uniform across the entire length of the detector, it is not possible to determine a defocus amount. On the other hand, if the scans both have the form of a step function, the defocus amount can be calculated with greater accuracy.

In a simple configuration, two straight linear strips are mounted horizontally as a focus detector. The defocus amount can be calculated as long as there is some contrast across the horizon—perhaps a flag pole standing against a clear sky. However, if the subject has only a vertical contrast (for example, a venetian blind) the horizontal linear strips will be unable to detect any contrast and will fail to calculate a defocus amount. In that situation, two vertical linear strips may succeed where a horizontal focus detector would fail. In a more elaborate design, the autofocus sensor uses four linear strips arranged as the arms of a cross. The cross-type autofocus sensor provides defocus amounts for both horizontal and vertical orientations, and a standard algorithm selects the arm of the cross that is best able to focus the scene.

However, this cross-type arrangement may still be inadequate. In some scenes, both the purely horizontal and the purely vertical detectors may provide insufficient contrast, in which event the photographer is forced to tilt the camera 45° to allow the detector to find adequate contrast and then rotate the camera back to its shooting position. Unfortunately, the time taken to find a suitable autofocus spot and to reposition the camera may cause a photographer to miss an important picture.

Modern top-of-the-line cameras have autofocus sensors with several cross-shaped focus detectors or combinations of cross-shaped and linear strip focus detectors arranged across the field of view. This further increases the likelihood of finding a satisfactory focus spot. However, there is still the possibility that a photographer may miss a picture if a suitable focus is not quickly obtained.

SUMMARY OF THE INVENTION

It is an object of the present invention to provide an improved autofocus sensor for use with a variety of cameras using a passive autofocusing system. In particular, the invention improves the camera's ability to find sufficient contrast in the field of view. The invention comprises novel arrangements of the CCD sensor strips that make up a focus detector and novel placements of the focus detectors across the field of view.

In accordance with the present invention, a focus detector is made up of one or more pairs of CCD sensor strips, each CCD sensor strip being shaped as an arc of a circle with a typical radius of two millimeters. Both sensor strips in a pair provide a scan of the light intensity from a curved segment of the field of view. Techniques for generating the scans from the sensor strips of a focus detector, processing the scans to calculate a defocus amount and selecting between multiple scans are well known in the art and are not elaborated further here.

Focus detectors with CCD sensor strips arranged in straight lines are limited to detecting a contrast in one direction, along the length of the CCD sensor strip. Curved sensor strips overcome this limitation as they are able to discern contrast in a multitude of directions.

In one embodiment of the invention ("Configuration A"), the autofocus sensor is a single focus detector made up of four strips each of which is shaped as a quarter arc of a circle and is located along one of the four quadrants of a circle whose diameter is approximately four millimeters. The focus detector has a generally circular shape and is located at the centre of the field of view. The focus detector produces four scans which are analyzed by standard means to determine a defocus amount.

(In this description, mention of "circle", "circular", and similar geometric terms is to be taken as permitting normal design and manufacturing tolerances and approximations, with the recognition that, for example, a circle or portion thereof may be approximated by one or more other geometrical elements.)

In a further embodiment of the invention ("Configuration B"), the autofocus sensor comprises eight strips each of which is shaped as a quarter arc of a circle. The eight strips are arranged as three focus detectors, as follows:

(1) four strips as in Configuration A;
 (2) two strips as a semicircle placed to the left of the central circle; and
 (3) two strips as a semicircle placed to the right of the central circle.

In a further embodiment of the invention ("Configuration C"), the autofocus sensor comprises twelve strips each of which is shaped as a quarter arc of a circle. The twelve strips are arranged as three circular focus detectors, each of which has four strips arranged on the circumference of a circle, located at approximately equal intervals across the horizontal axis of the field of view (i.e., equal intervals within usual design and manufacturing tolerances).

In a further embodiment of the invention ("Configuration D"), the autofocus sensor comprises sixteen strips each of which is shaped as a quarter arc of a circle. The sixteen strips are arranged as five focus detectors, as follows:

(1) twelve strips as in Configuration C;
 (2) two strips as a semicircle placed above the central circle; and
 (3) two strips as a semicircle placed below the central circle.

In a further embodiment of the invention ("Configuration E"), the autofocus sensor comprises twenty strips each of which is shaped as a quarter arc of a circle. The twenty strips are arranged as seven focus detectors, as follows:

(1) twelve strips as in Configuration C;
 (2) two strips as a semicircle placed above and midway between the central and the left circles;
 (3) two strips as a semicircle placed above and midway between the central and the right circles;
 (4) two strips as a semicircle placed below and midway between the central and the left circles; and
 (5) two strips as a semicircle placed below and midway between the central and the right circles;

In those embodiments where there is more than one focus detector, the selection of focus detector to use is made either by the photographer manually or by a microprocessor using a known algorithm. The calculation of the defocus amount is made by standard means from the scans provided at each focus detector.

The fabrication of curved CCD sensor strips does not present a technical difficulty. Such curved CCD sensor strips can be readily manufactured with existing techniques known to those skilled in the art. Note that curvature of a series of elements can be approximated by sequential slight misalignment of successive elements so that the entire sequence of elements approximates the intended curve. The invention embraces design and manufacturing approximations of this sort.

Configuration E is the preferred embodiment. Although somewhat more complex to manufacture, this configuration provides the best ability to focus on subjects of varied shapes located at different points in the field of view.

DETAILED DESCRIPTION

A number of embodiments of the invention will be described with reference to the accompanying drawings.

Figure 1:
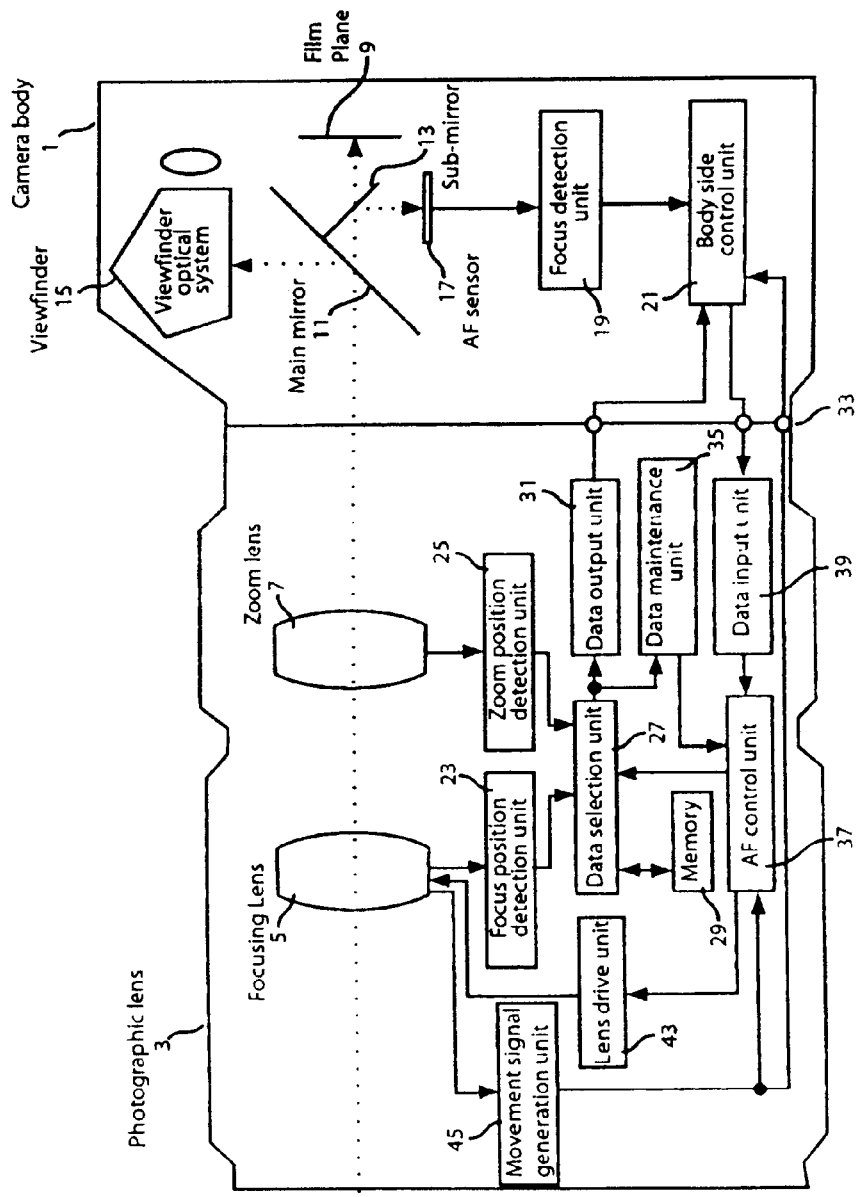
FIG. 1 is a schematic diagram of the structure of a typical single lens reflex autofocus camera (FIG. 1 of U.S. Pat. No. 6,085,041, "Autofocus system and photographic lens", Shiokama, issued Jul. 4, 2000).

FIG. 1 shows a schematic drawing of a typical autofocus single lens reflex camera as disclosed in FIG. 1 of U.S. Pat. No. 6,085,041 ("Autofocus system and photographic lens", Shiokama, issued Jul. 4, 2000). This patent serves as a representative example of the organization of the components in a modern autofocus camera.

Light reflected from a subject enters the camera through a detachable photographic lens 3 which is electrically connected to the camera body 1 via electrical contact points 33 on a mounting surface. The detachable photographic lens 3 contains a lens drive unit 43 and control circuitry (23, 25, 27, 29, 31, 35, 37, 39, 45) by which a focusing lens 5 may be repositioned according to signals received from the body side control unit 21 through the electrical contact points 33 taking into account the position of the zoom lens 7. Portions of the light entering the photographic lens 3 are directed by partially reflective mirrors (11 and 13) to a viewfinder 15, a film plane 9 and an autofocus sensor 17. A focus detection unit 19 controls the operation of the autofocus sensor 17 and uses data generated in the autofocus sensor 17 to calculate a defocus amount. The defocus amount is suitably transformed by the focus detection unit 19 and transmitted to the control circuitry (23, 25, 27, 29, 31, 35, 37, 39, 45) through the body side control unit 21 so that the lens drive unit 43 is actuated to move the focusing lens 5 so that the subject image is focused on the film plane 9.

Figure 2:
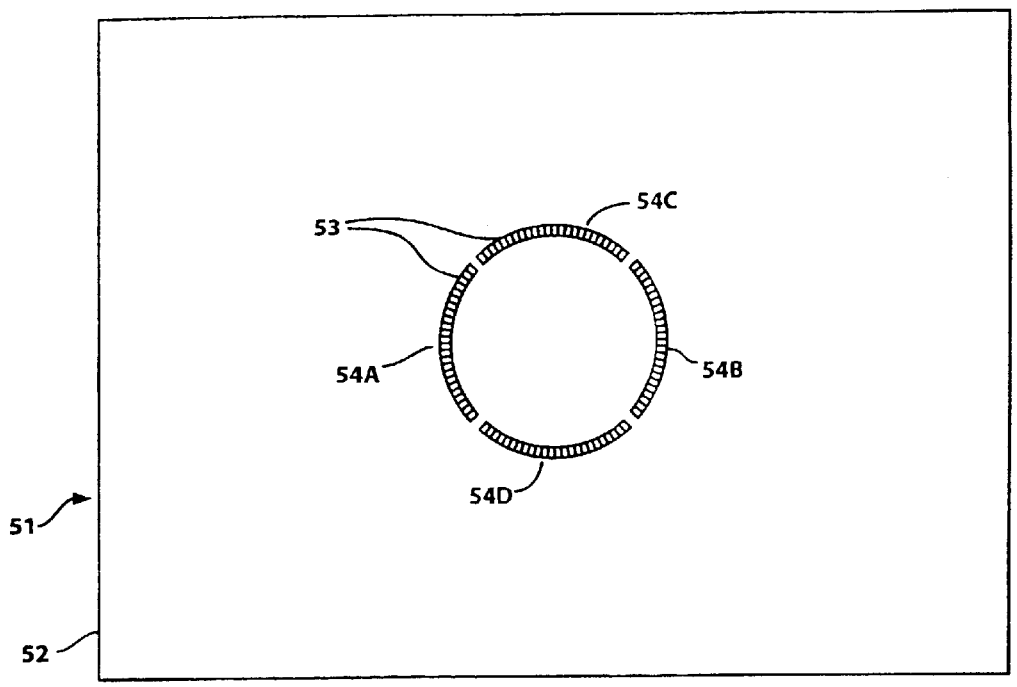
FIG. 2 is a schematic drawing showing the general layout and shapes of autofocus sensor components (strips) shown mounted on a suitable base plate in accordance with an embodiment of the present invention in which the autofocus sensor uses four CCD sensor strips (Configuration A).

FIG. 2 is a schematic drawing of an embodiment (Configuration A) of an autofocus sensor 51 conforming with the present invention. The autofocus sensor 51 comprises a base plate 52 typically made of silicon on which a plurality of charge coupled device (CCD) elements 53 are mounted. When the autofocus sensor 51 is illuminated with light reflected from the subject, charges accumulate on the CCD sensor elements 53 in proportion to the energy of the incident light. The CCD sensor elements 53 are arranged in four curved sensor strips (54A to 54D) as the four quadrants of a circle. Typically, each sensor strip (54A to 54D) has 50 CCD sensor elements 53 (not all of which are shown in the drawings). The four sensor strips of Configuration A are treated as pairs. The first pair comprises strips 54A and 54B; the second, strips 54C and 54D.

With reference to FIGS. 1 and 2, at suitable periodic times programmed into the autosensor mechanism in accordance with the designer's preference, the focus detection unit 19 reads the CCD sensor elements 53 and records the voltages. Typically, each sensor strip (54A to 54D) produces 50 voltage values each of which corresponds to a scan of the light intensity across a curved portion of the subject image.

With reference to FIGS. 1 and 2, the focus detection unit 19, using standard techniques, selects which of the two CCD sensor strip pairs (54A and 54B or 54C and 54D) has the best contrast and computes the defocus amount. The defocus amount is used by the control circuitry of the camera (23, 25, 27, 29, 31, 35, 37, 39, 45) and the lens drive unit 43 to adjust the focusing lens 5 to provide a correct focus.

Alternative configurations of CCD sensor elements 53 are demonstrated in FIGS. 3 to 6.

Figure 3:
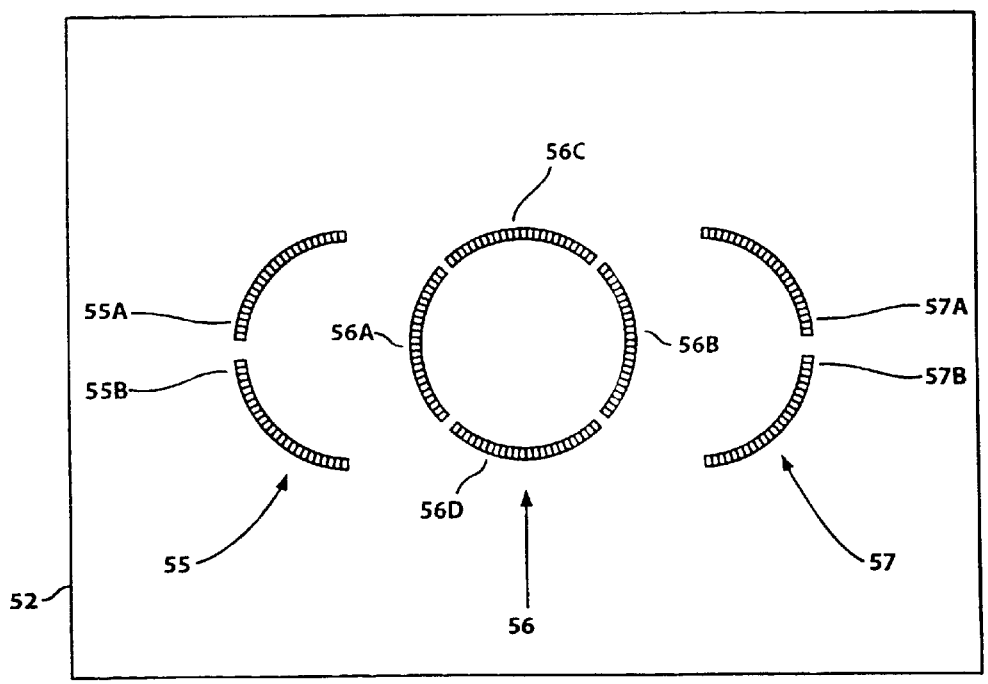
FIG. 3 is a schematic drawing showing the general layout and shapes of autofocus sensor components (strips) shown mounted on a suitable base plate in accordance with an embodiment of the present invention in which the autofocus sensor uses eight CCD sensor strips (Configuration B).

In FIG. 3 (Configuration B), there are eight CCD sensor strips (55A and 55B, 56A to 56D, 57A and 57B) making up three focus detectors (55, 56 and 57). Focus detector 56 is comprised of four CCD sensor strips arranged in two pairs (56A and 56B; 56C and 56D), is circular and located at the centre of the base plate 52. Focus detector 55 is comprised of one pair of CCD sensor strips (55A and 55B), shaped as a semicircle and located to the left of the central focus detector 56. Focus detector 57 is comprised of one pair of CCD sensor strips (57A and 57B), shaped as a semicircle and located to the right of the central focus detector 56.

Figure 4:
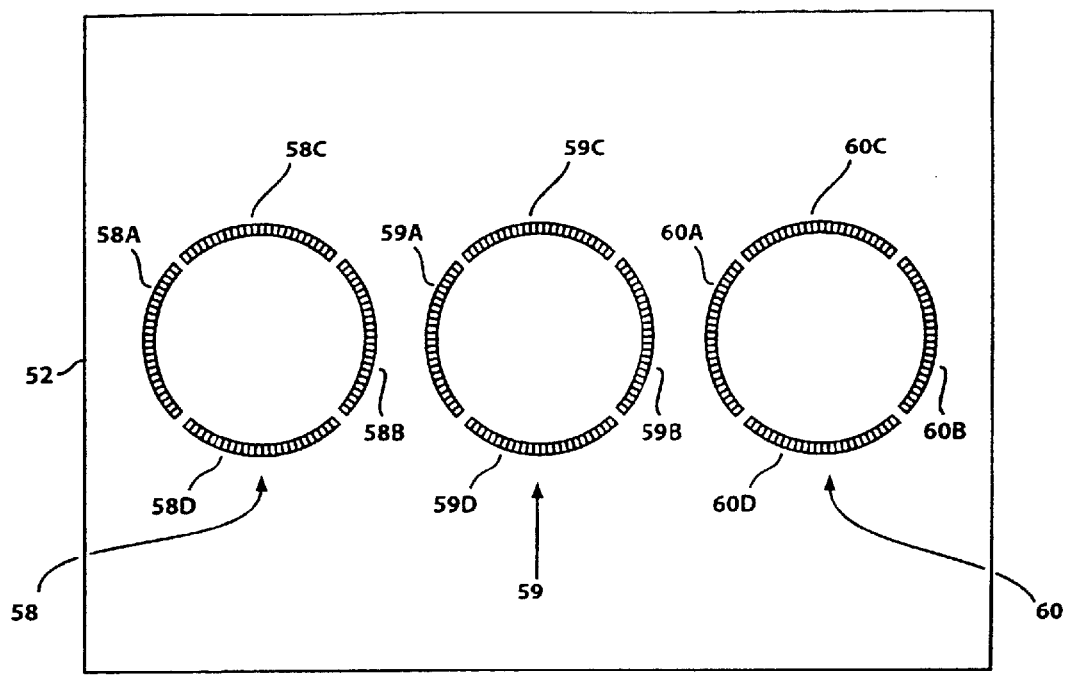
FIG. 4 is a schematic drawing showing the general layout and shapes of autofocus sensor components (strips) shown mounted on a suitable base plate in accordance with an embodiment of the present invention in which the autofocus sensor uses twelve CCD sensor strips (Configuration C).

In FIG. 4 (Configuration C), there are 12 CCD sensor strips (58A to 58D, 59A to 59D and 60A to 60D) making up three focus detectors (58, 59 and 60). Focus detector 59 is comprised of four CCD sensor strips arranged in two pairs (59A and 59B; 59C and 59D), is circular and located at the centre of the base plate 52. Focus detector 58 is comprised of four CCD sensor strips arranged in two pairs (58A and 58B; 58C and 58D), is circular and located to the left of the central focus detector 59. Focus detector 60 is comprised of four CCD sensor strips arranged in two pairs (60A and 60B; 60C and 60D), is circular and located to the right of the central focus detector 59.

Figure 5:
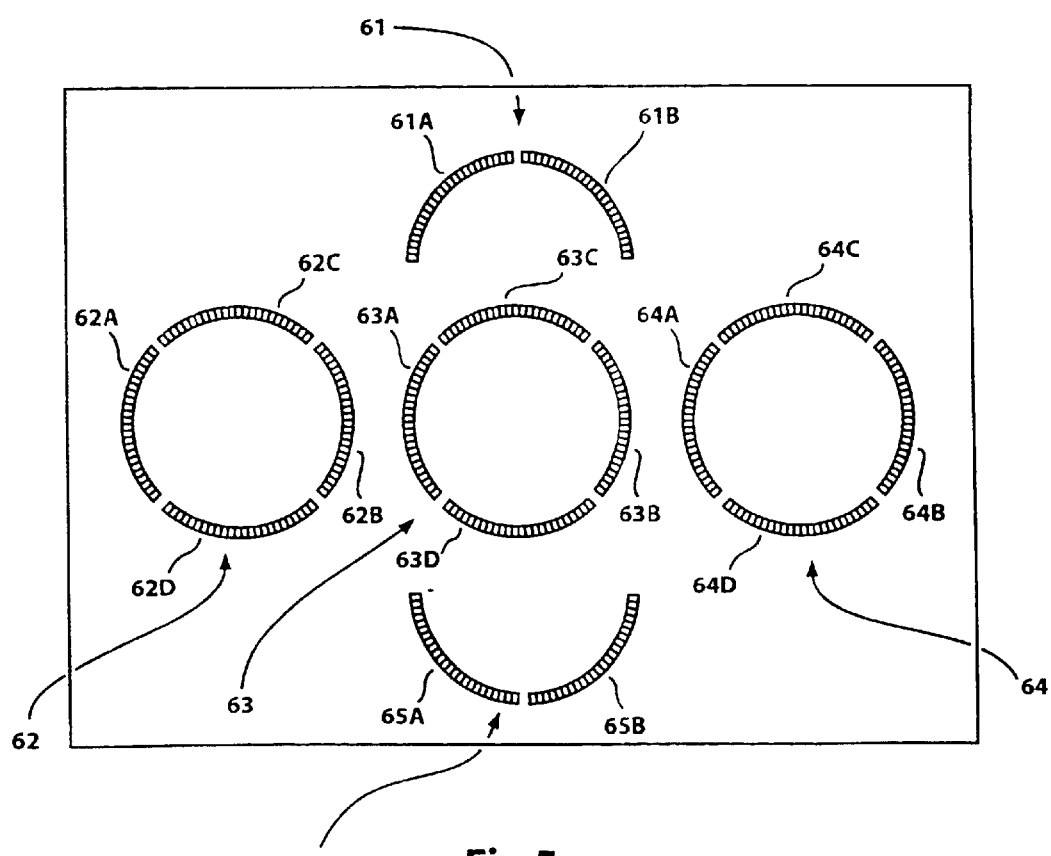
FIG. 5 is a schematic drawing showing the general layout and shapes of autofocus sensor components (strips) shown mounted on a suitable base plate in accordance with an embodiment of the present invention in which the autofocus sensor uses sixteen CCD sensor strips (Configuration D).

In FIG. 5 (Configuration D), there are 16 CCD sensor strips (61A and 61B, 62A to 62D, 63A to 63D, 64A to 64D, 65A and 65B) making up five focus detectors (61 to 65). Twelve CCD sensor strips (62A to 62D, 63A to 63D and 64A to 64D) are placed as three focus detectors (62, 63 and 64) in the same configuration as Configuration C (FIG. 4). Focus detector 61 is comprised of one pair of CCD sensor strips (61A and 61B), shaped as a semicircle and located above the central focus detector 63. Focus detector 65 is comprised of one pair of CCD sensor strips (65A and 65B), shaped as a semicircle and located below the central focus detector 63.

Figure 6:
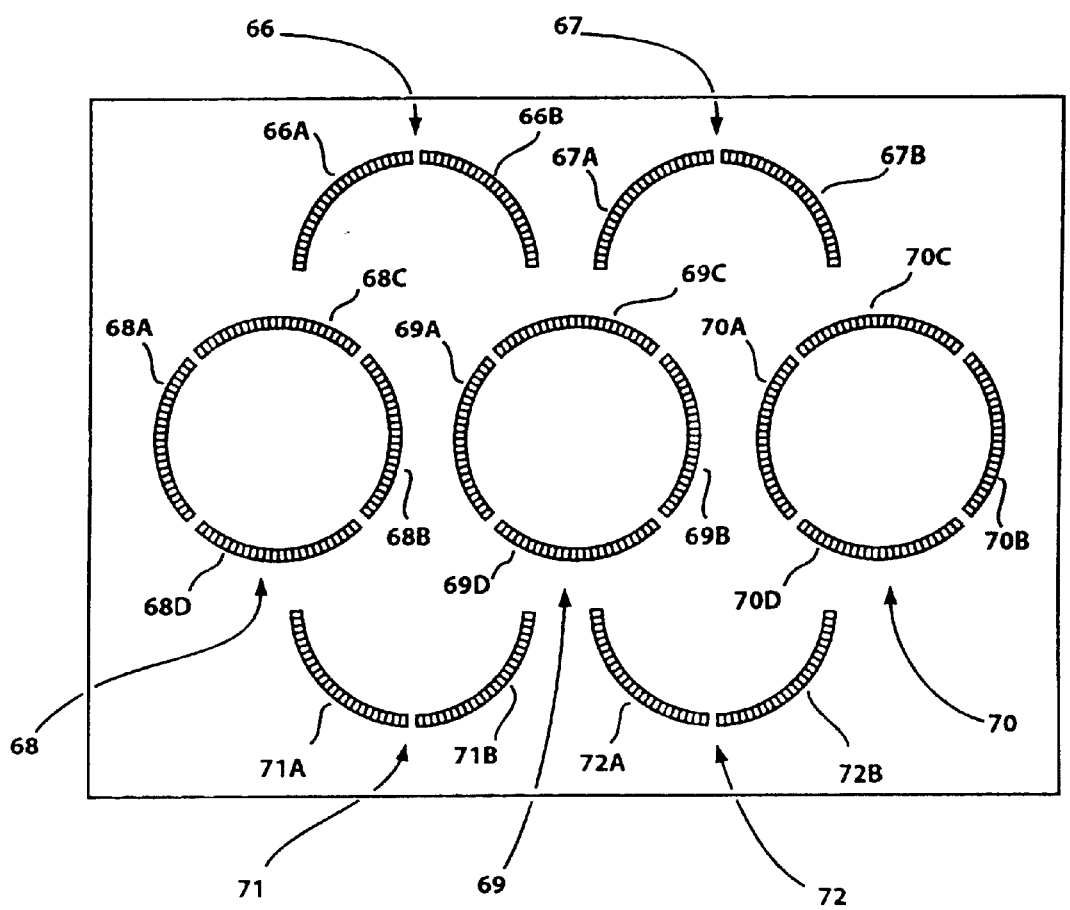
FIG. 6 is a schematic drawing showing the general layout and shapes of autofocus sensor components (strips) shown mounted on a suitable base plate in accordance with an embodiment of the present invention in which the autofocus sensor uses twenty CCD sensor strips (Configuration E).

FIG. 6 (Configuration E) shows the preferred configuration in which there are 20 CCD sensor strips (66A and 66B, 67A and 67B, 68A to 68D, 69A to 69D, 70A to 70D, 71A and 71B, 72A and 72B) making up seven focus detectors (66 to 72). Twelve CCD sensor strips (68A to 68D, 69A to 69D and 70A to 70D) are placed as three focus detectors (68, 69 and 70) in the same configuration as Configuration C (FIG. 4). Focus detector 66 is comprised of one pair of CCD sensor strips (66A and 66B), shaped as a semicircle and located above and midway between the central focus detector 69 and the left focus detector 68. Focus detector 67 is comprised of one pair of CCD sensor strips (67A and 67B), shaped as a semicircle and located above and midway between the central focus detector 69 and the right focus detector 70. Focus detector 71 is comprised of one pair of CCD sensor strips (71A and 71B), shaped as a semicircle and located below and midway between the central focus detector 69 and the left focus detector 68. Focus detector 72 is comprised of one pair of CCD sensor strips (72A and 72B), shaped as a semicircle and located below and midway between the central focus detector 69 and the right focus detector 70.

With reference to FIGS. 2 to 6, the choice of number of CCD sensor elements 53 in and the curvature of each CCD sensor strip (54A to 54D; 55A and 55B; 56A to 56D; 57A and 57B; 58A to 58D; 59A to 59D; 60A to 60D; 61A and 61B; 62A to 62D; 63A to 63D; 64A to 64D; 65A and 65B; 66A and 66B; 67A and 67B; 68A to 68D; 69A to 69D; 70A to 70D; 71A and 71B; and 72A and 72B) and the spacing between the CCD sensor elements 53 are parameters to be suitably chosen by the designer.

In Configurations B to E, where the autofocus sensor has more than one focus detector, the selection of focus detector to use is made either by the photographer manually or by a microprocessor using an algorithm readily devised using known principles or by a straightforward extrapolation of known principles.

As will be apparent to those skilled in the art, many alterations and modifications are possible in the practice of this invention without departing from the spirit or scope thereof. Accordingly, the scope of the invention is defined by the following claims.

What is claimed is:

1. In a camera comprising:
   (a) a focusing lens for capturing light from an illuminated subject and focusing a portion of that light onto a light-receptive medium or device;
   (b) a motor and drive means for moving the focusing lens so as to change the focus of the image of the subject on the light-receptive medium or device;
   (c) control circuitry that controls the operation of the motor and drive means in response to a received input signal;
   (d) a focus detection unit, responsive to voltage scans representing light intensity, and operating to calculate a defocus amount that is transmitted as the input signal to the control circuitry;
   (e) a passive autofocus sensor comprising a backing substrate and at least one focus detector each of which provides voltage data to the focus detection unit, said focus detectors each comprising one or more pairs of CCD sensor strips, each of which sensor strips:
      (i) comprises a line of CCD sensors;
      (ii) supplies, at intervals, the voltages produced on the CCD sensors to the focus detection unit for use in the calculation of the defocus amount; and
   (f) an optical path provided by one or more mirrors, prisms and lenses for reflecting and focusing a portion of the light arriving from the focusing lens onto the CCD sensors in the autofocus sensor;
the improvement characterized in that the autofocus sensor has one or more focus detectors in which the CCD sensor strips are curved and arranged to follow arcs of circles of identical diameters or to form the circumferences of one or more circles of identical diameters.

2. The improvement of claim 1 wherein the autofocus sensor comprises a single focus detector of a generally circular shape, located at the centre of the autofocus sensor, and formed of four CCD sensor strips:
   (a) each of which is shaped as a quarter arc of a circle; and
   (b) that are positioned end to end along the four quadrants of a central circle.

3. The improvement of claim 1 wherein the autofocus sensor comprises three focus detectors formed of a total of eight CCD sensor strips:
   (a) each of which is shaped as a quarter arc of a circle;
   (b) four of which are located in the vicinity of the centre of the autofocus sensor and are positioned end to end along the four quadrants of a central circle to form a generally circular shape;
   (c) two of which are located end to end to form a semicircle located midway vertically and to the left of the central circle; and
   (d) two of which are located end to end to form a semicircle located midway vertically and to the right of the central circle.

4. The improvement of claim 1 wherein the autofocus sensor comprises three focus detectors formed of a total of twelve CCD sensor strips:
   (a) each of which is shaped as a quarter arc of a circle;
   (b) four of which are located in the vicinity of the centre of the autofocus sensor and are positioned end to end along the four quadrants of a central circle to form a generally circular shape;
   (c) four of which are located end to end along the four quadrants of a circle forming a generally circular shape located midway vertically and to the left of the central circle; and
   (d) Four of which are located end to end along the four quadrants of a circle forming a generally circular shape located midway vertically and to the right of the central circle.

5. The improvement of claim 1 wherein the autofocus sensor comprises five focus detectors formed of a total of sixteen CCD sensor strips:
   (a) each of which is shaped as a quarter arc of a circle;
   (b) four of which are located in the vicinity of the centre of the autofocus sensor and are positioned end to end along the four quadrants of a central circle to form a generally circular shape;
   (c) four of which are located end to end along the four quadrants of a circle forming a generally circular shape located midway vertically and to the left of the central circle;
   (d) four of which are located end to end along the four quadrants of a circle forming a generally circular shape located midway vertically and to the right of the central circle.
   (e) two of which are located end to end to form a semicircle located midway horizontally and above the central circle; and
   (f) two of which are located end to end to form a semicircle located midway horizontally and below the central circle.

6. The improvement of claim 1 wherein the autofocus sensor comprises seven focus detectors formed of a total of twenty CCD sensor strips:
   (a) each of which is shaped as a quarter arc of a circle;
   (b) four of which are located in the vicinity of the centre of the autofocus sensor and are positioned end to end along the four quadrants of a central circle to form a generally circular shape;
   (c) four of which are located end to end along the four quadrants of a circle forming a generally circular shape located midway vertically and to the left of the central circle;
   (d) four of which are located end to end along the four quadrants of a circle forming a generally circular shape located midway vertically and to the right of the central circle;
   (e) two of which are located end to end to form a semicircle located above and midway between the left and central circles;
   (f) two of which are located end to end to form a semicircle located above and midway between the right and central circles;

(g) two of which are located end to end to form a semicircle located below and midway between the left and central circles; and (h) two of which are located end to end to form a semicircle located below and midway between the right and central circles.

7. The improvement of claim 1, wherein the sensor strips are substantially identical to one another.

8. The improvement of claim 7, wherein the sensor strips each subtend an angle of about 90°.

9. The improvement of claim 8, comprising two said sensor strips positioned end to end with a gap therebetween that is small relative to the length of a said sensor strip, thereby to form an interrupted semicircle.

10. The improvement of claim 8, comprising four said sensor strips arrayed in oppositely oriented pairs wherein the sensor strips in each pair are positioned substantially end to end with a gap therebetween that is small relative to the length of a said sensor strip, thereby to form an interrupted circle or a pair of substantially identical oppositely oriented interrupted semicircles.

11. In passive autofocusing apparatus, at least two aligned non-contiguous arrays of CCD sensor elements, each said array comprising a plurality of CCD sensor elements arranged in an arcuate pattern, the arrays together forming an interrupted circular or semicircular annular pattern, the interruption in the annular pattern being small relative to the size of the annular pattern.

12. Apparatus as defined in claim 11, wherein the CCD sensor elements in each said array are mounted on a discrete strip that follows an arc of a circle, said arc being substantially coincident with a portion of the annular pattern.

13. Apparatus as defined in claim 12, wherein each array subtends an angle of approximately 90°.

* * * * *